(12) United States Patent
Ling et al.

(10) Patent No.: US 11,584,205 B2
(45) Date of Patent: Feb. 21, 2023

(54) SILENCED GUIDE RAIL

(71) Applicants: HSIN CHONG MACHINERY WORKS CO. LTD., Taoyuan (TW); FUZHOU MINGFANG AUTOMOBILE PARTS INDUSTRY CO., LTD., Fuzhou (CN)

(72) Inventors: Zhi-Wen Ling, Fuzhou (CN); Mei-Qing Zheng, Fuzhou (CN); Xi Chen, Fuzhou (CN); Yuan-Ming Liang, Taoyuan (TW); Chi-Ming Huang, Taoyuan (TW); Jeffrey Chung-Chiang Hsi, Taoyuan (TW)

(73) Assignees: HSIN CHONG MACHINERY WORKS CO. LTD., Taoyuan (TW); FUZHOU MINGFANG AUTOMOBILE PARTS INDUSTRY CO., LTD., Fuzhou (CN)

( * ) Notice: Subject to any disclaimer, the term of this patent is extended or adjusted under 35 U.S.C. 154(b) by 0 days.

(21) Appl. No.: 17/409,758

(22) Filed: Aug. 23, 2021

(65) Prior Publication Data
US 2022/0111711 A1 Apr. 14, 2022

(30) Foreign Application Priority Data
Oct. 14, 2020 (CN) .......................... 202022283773.9

(51) Int. Cl.
*B60J 7/02* (2006.01)
*B60J 7/043* (2006.01)

(52) U.S. Cl.
CPC ............... *B60J 7/022* (2013.01); *B60J 7/043* (2013.01)

(58) Field of Classification Search
CPC ... B60J 7/022; B60J 7/043; B60J 7/057; B60J 7/0573; B60J 7/024
USPC .............................................. 296/216.08, 223
See application file for complete search history.

(56) References Cited

U.S. PATENT DOCUMENTS 8,292,359 B2 * 10/2012 Maruyama ............... B60J 7/022
296/223

FOREIGN PATENT DOCUMENTS

EP 2650156 B1 * 3/2015 .............. B60J 7/024

* cited by examiner

*Primary Examiner* — Dennis H Pedder
(74) *Attorney, Agent, or Firm* — Chun-Ming Shih; HDLS IPR Services

(57) ABSTRACT

A silenced guide rail includes a guide rail body, a guide block, and a slideway. The guide rail body includes a beam piece, and the beam piece includes an abutting end. The guide block is connected to one end of the guide rail body, and the guide block includes a docking strip. The docking strip includes a corresponding abutting end corresponding to the abutting end. The abutting end includes a short side and a bevel. A shape of the corresponding abutting end corresponds to a shape formed by the short side and the bevel. The slideway is formed on the beam piece and the docking strip. Therefore, the present disclosure reduces an abnormal noise generated when a guide post passes through a connection between the guide rail body and the guide block, and an effect of eliminating all or most of the abnormal noise may be achieved.

10 Claims, 11 Drawing Sheets

SILENCED GUIDE RAIL

BACKGROUND

Technical Field

The present disclosure is related to a guide rail, in particular to a silenced guide rail.

Description of Related Art

Regarding a guiding rail, it is used to guide a guided object with a guide post, especially to guide the guided object with guiding direction perpendicular to a gravity force (for example, a sunroof that may be opened and closed). Since the guiding direction is perpendicular to the gravity force, if a guide groove of the guide rail is a two-piece assembly of a guide rail body and a guide block, there is a high-low level difference (step difference) at an assembled part between the guide rail body and the guide block. When the guide post passes through the high-low level difference, an abnormal noise generates due to an influence of gravity. The high-low level difference is parallel to the guide post. Therefore, when the guide post passes through the high-low level difference, the guide post and the assembled part collide with each other, to generate the abnormal sound with a large volume, which has become a technical problem for a long time.

SUMMARY

A purpose of the present disclosure is to provide a silenced guide rail.

In order to achieve the purpose above-mentioned, the present disclosure provides a silenced guide rail includes a guide rail body, a guide block, and a slideway. The guide rail body includes a beam piece, and the beam piece includes an abutting end. The guide block is connected to one end of the guide rail body, and the guide block includes a docking strip. The docking strip includes a corresponding abutting end corresponding to the abutting end. The abutting end includes a short side and a bevel. The short side corresponding to a width of the beam piece. The bevel is diagonally connected to one end of the short side, and the bevel is inclined along a direction of a length of the beam piece. A shape of the corresponding abutting end corresponds to a shape formed by the short side and the bevel. The slideway is formed on the beam piece and the docking strip.

Compared with the related art, the present disclosure reduces an abnormal noise generated when a guide post passes through a connection between the guide rail body and the guide block, and an effect of eliminating all or most of the abnormal noise may be achieved.

DETAILED DESCRIPTION

The technical content and detailed description of the present disclosure are now described with the drawings as follows. The present disclosure is not limited thereof.

Figure 7:
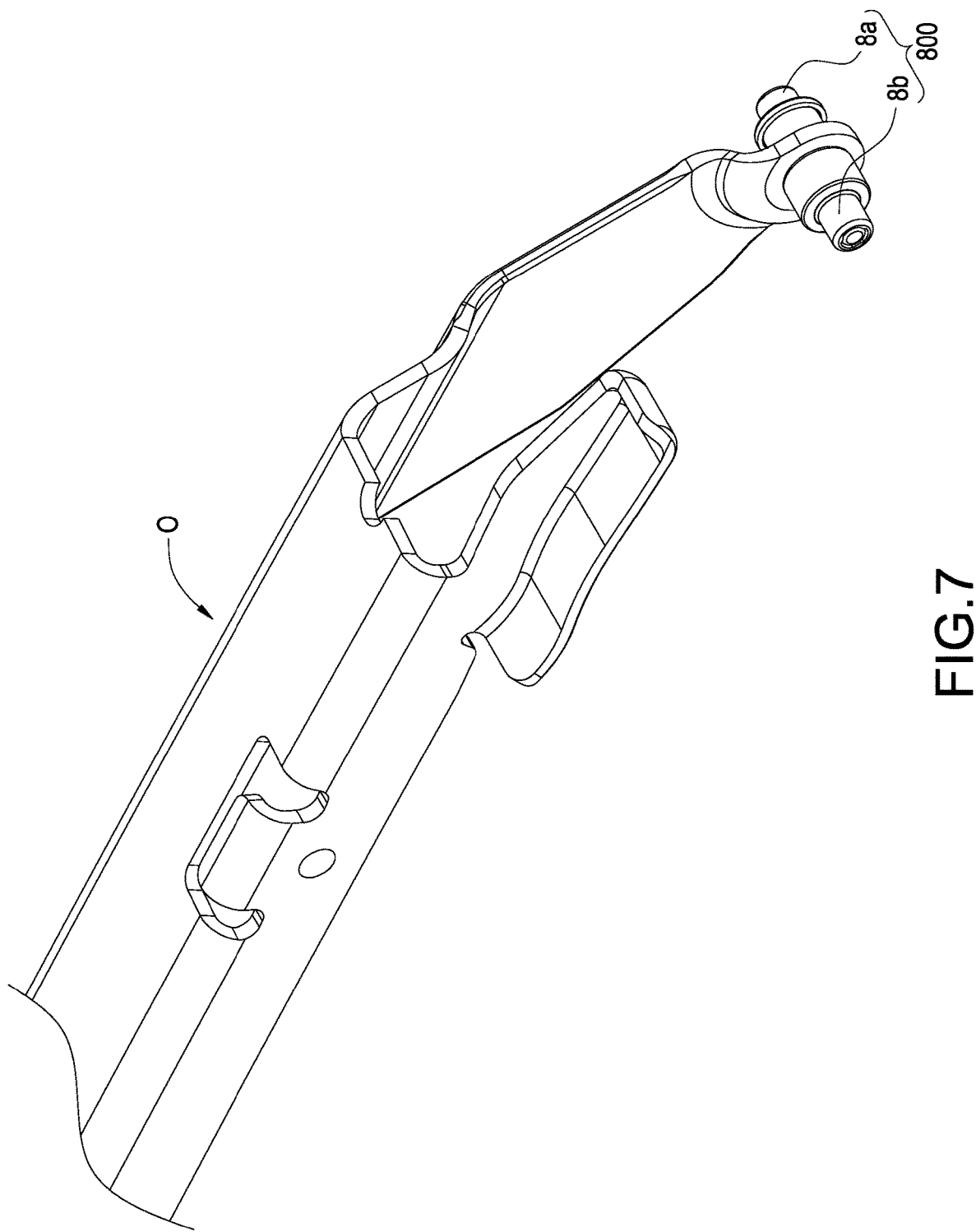
FIG. 7 is a perspective diagram of a guide post in the silenced guide rail of the present disclosure when it is connected to a guided object.
Figure 8:
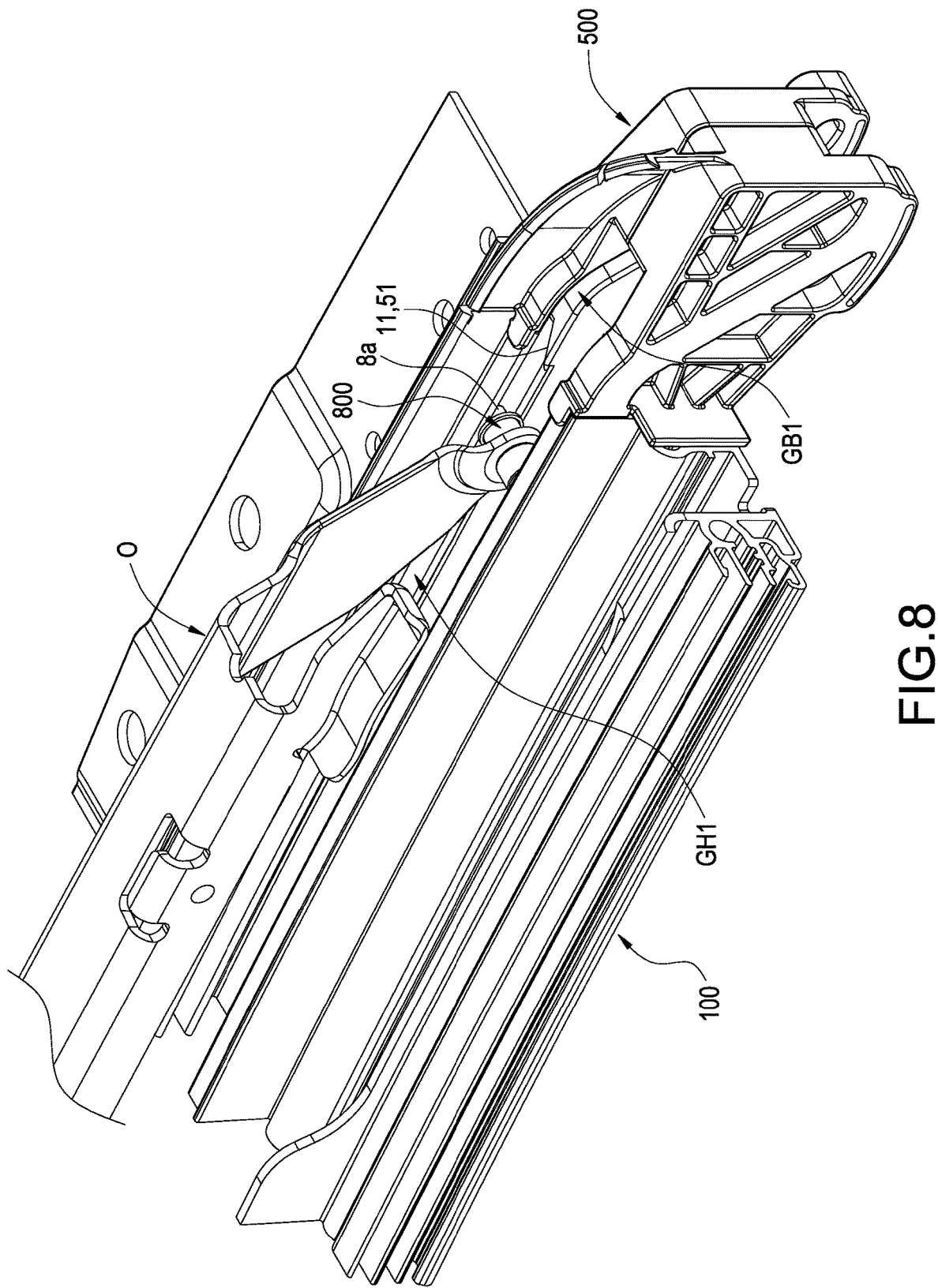
FIG. 8 is a perspective assembly diagram of the silenced guide rail of the present disclosure (including the guide post).

The present disclosure provides a silenced guide rail for guiding a guided object O as shown in FIG. 7. The guided object O is any object that may be guided, especially an object whose guiding direction is perpendicular to gravity. For example, a sunroof that may be opened and closed. The guided object O shown in FIG. 7 may be a glass frame of the sunroof. The present disclosure is not limited thereof.

As shown in FIG. 1 to FIG. 5, the silenced guide rail of the present disclosure may be a single slideway rail (or a single guide groove mode) with a single-ended guide post, or may be the single slideway rail (or the single guide groove mode) with a double-ended guide post. The present disclosure may also be a double slideway rail (or a double guide groove rail) with a double-ended guide post. As long as any end of the guide post is slidably connected to any slideway (or any guide groove), an effect of eliminating all or most of the abnormal noise may be achieved. The present disclosure is not limited thereof. In the embodiment of the present disclosure, the double slideway rail (or the double guide groove rail) with a double-ended guide post is used for description.

The silenced guide rail of the present disclosure includes a guide rail body 100, a guide block 500, a slideway (for example, S1 in FIG. 6), and a guide post 800. The guide rail body 100 defines a guiding direction D, and the guiding direction D is substantially perpendicular to a direction of gravity and substantially parallel to a ground plane.

The guide rail body 100 includes a first beam piece 1b and a second beam piece 2b respectively protruding along a direction of the ground plane, and symmetrically arranged with each other (for example, they may be arranged in bilateral symmetry with each other as shown in the drawings). The first beam piece 1b and the second beam piece 2b are elongated, and therefore have a length, width and thickness. The first beam piece 1b has an abutting end 11 corresponding to the width and a long side 12 corresponding to the length. The second beam piece 2b has an abutting end 21 corresponding to the width and a long side 22 corresponding to the length. The abutting end 11 of the first beam piece 1b includes a first short side 111 and a first bevel 112. The first bevel 112 is inclined along a direction of the length of the first beam piece 1b, and a chamfered portion C1 with a cutaway is formed on a corner of the first beam piece 1b between one end of the first bevel 112 connected to the long side 12 and one end of the first bevel 112 connected to the first short side 111. The abutting end 11 of the second beam piece 2b includes a second short side 211 and a second bevel 212. The second bevel 212 is inclined along a direction of the length of the second beam piece 2b, and a chamfered portion C2 with a cutaway is formed on a corner of the second beam piece 2b between one end of the second bevel 212 connected to the long side 22 and one end of the second bevel 212 connected to the second short side 211. Each long side 12, 22 is parallel to the guiding direction D. The first short side 111 and the second short side 211 are correspondingly perpendicular to the two long sides 12 and 22 respectively.

Figure 1:
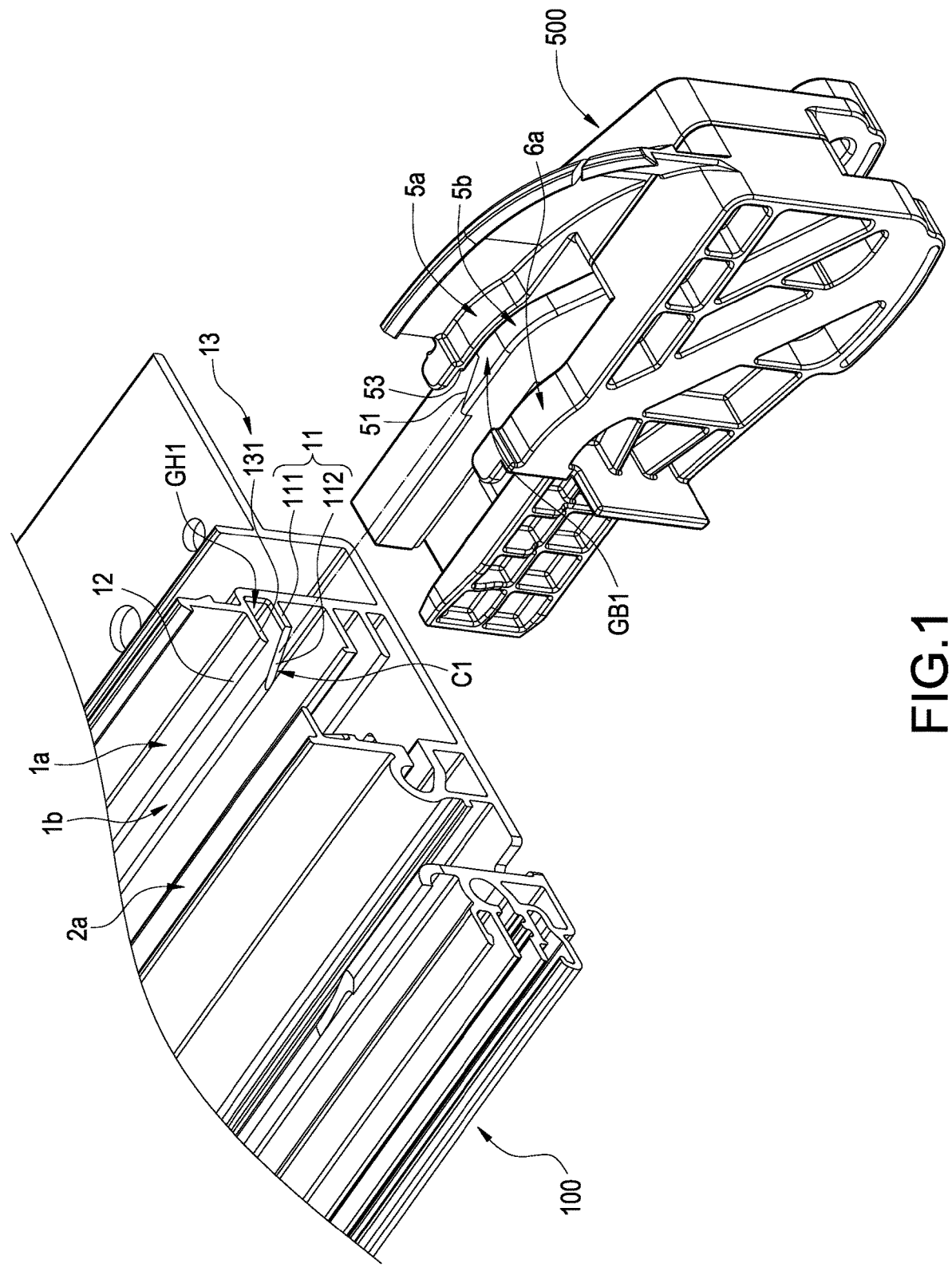
FIG. 1 is a perspective exploded view of a silenced guide rail of the present disclosure (guide post is omitted) from a view angle.
Figure 2:
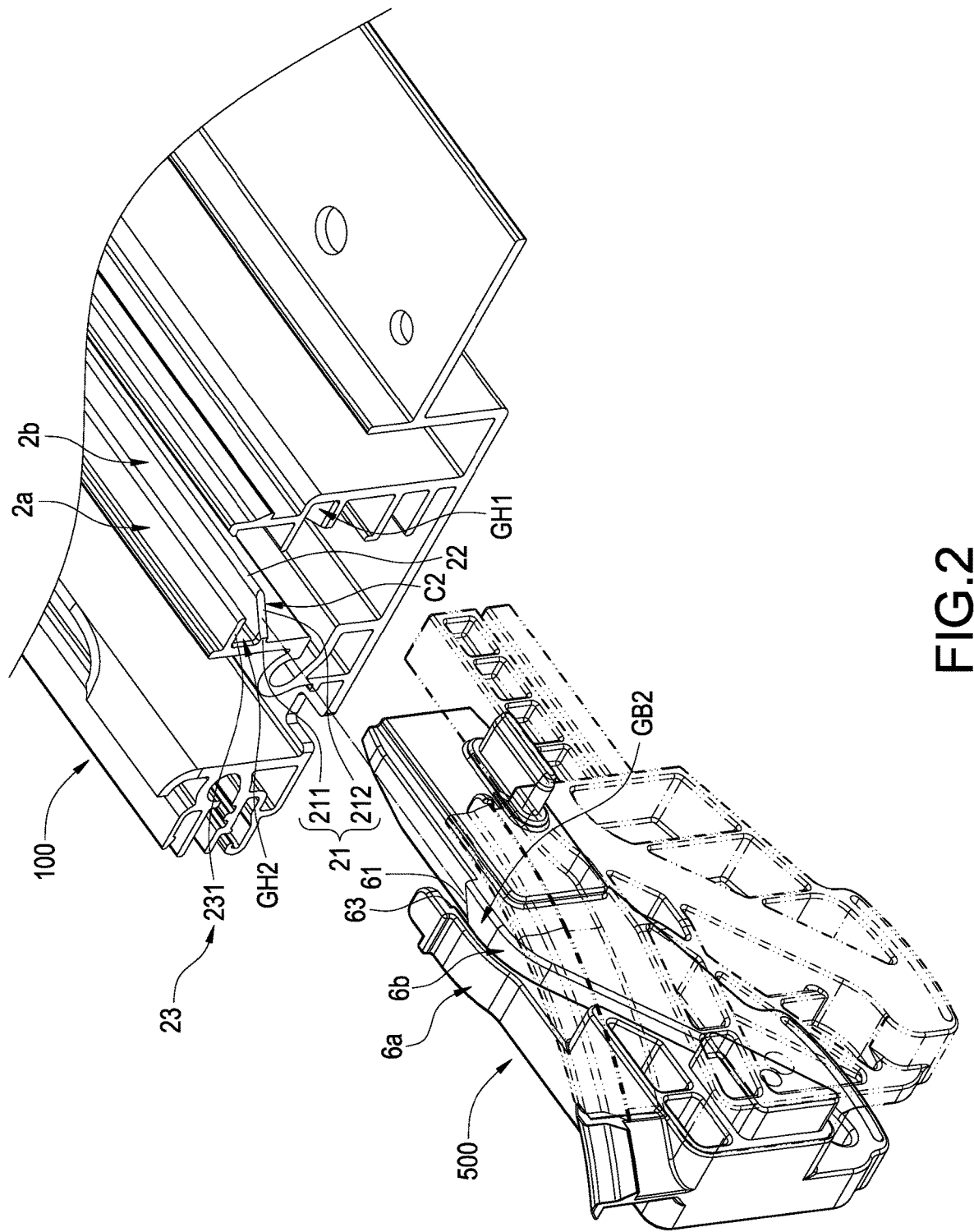
FIG. 2 is a perspective exploded view of the silenced guide rail of the present disclosure (guide post is omitted) from another view angle.
Figure 3:
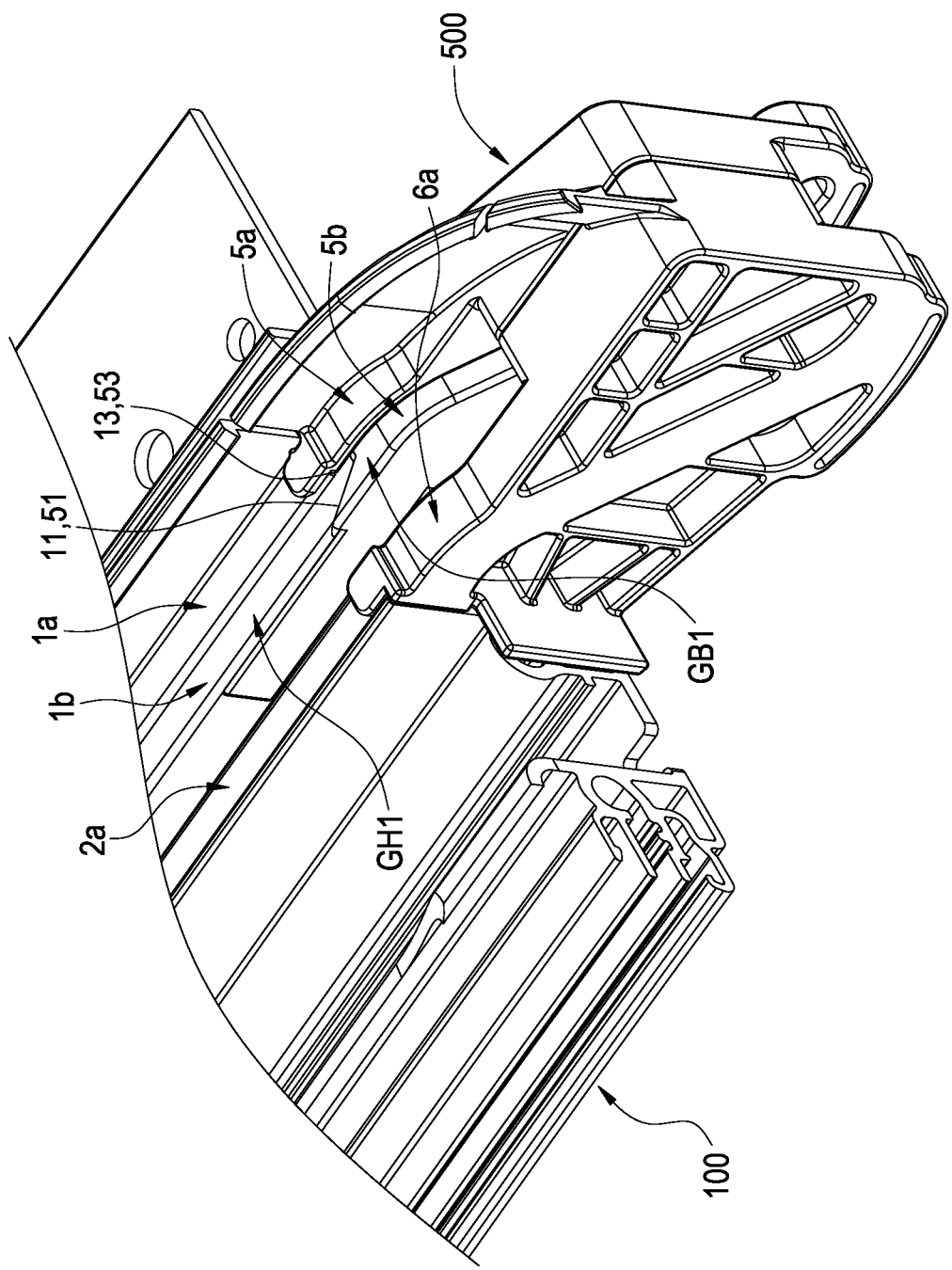
FIG. 3 is a perspective assembly diagram of the silenced guide rail of the present disclosure corresponding to FIG. 1.
Figure 4:
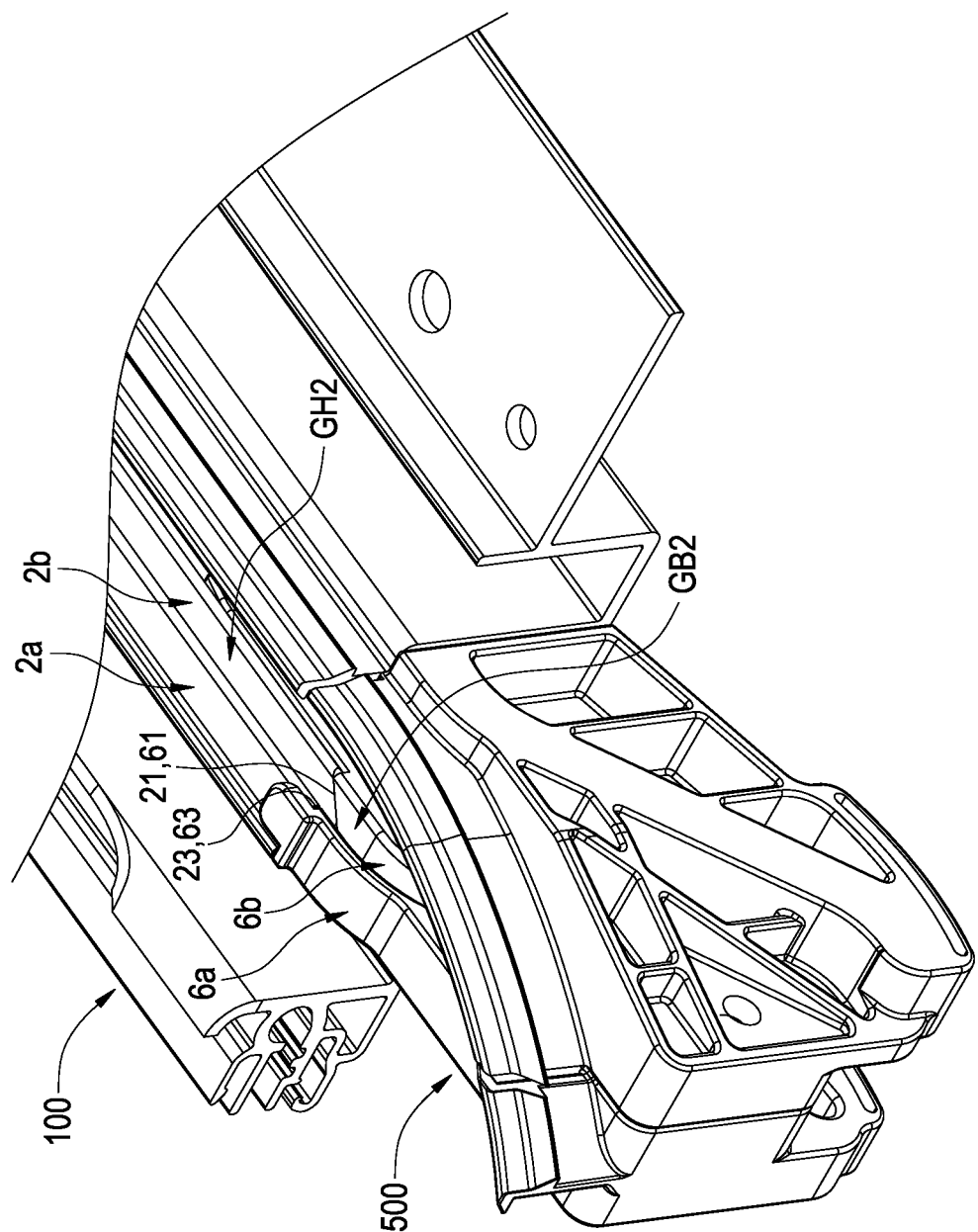
FIG. 4 is a perspective assembly diagram of the silenced guide rail of the present disclosure corresponding to FIG. 2.
Figure 5:
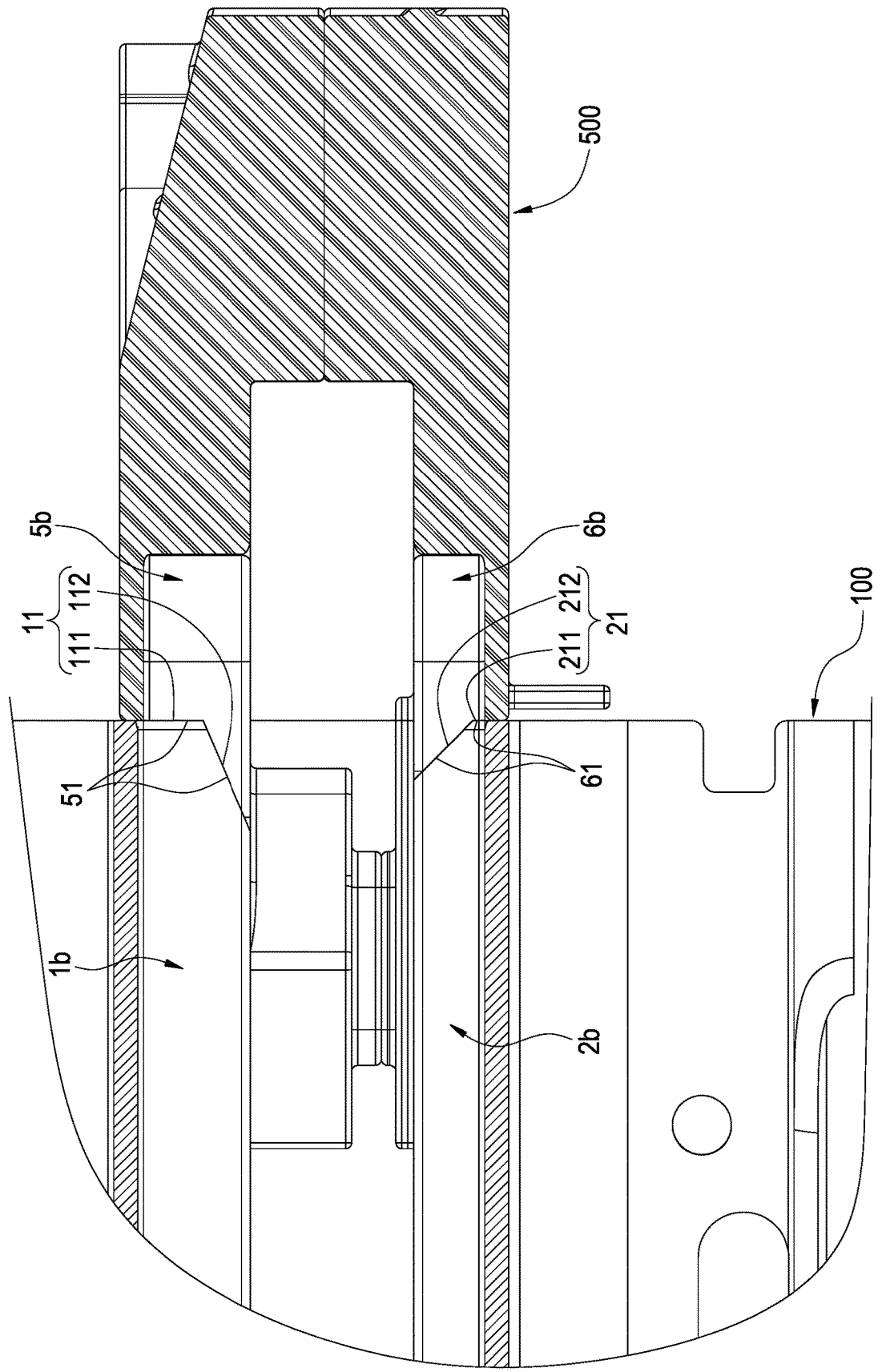
FIG. 5 is a top view of the silenced guide rail of the present disclosure.

As shown in FIG. 5, the corners of the first beam piece 1b and the second beam piece 2b are formed with chamfered portions C1, C2. A length of the first short side 111 and a length of the long side 12 are both shorter than the lengths of the original first short side 111 and the original long side 12 without chamfer. A length of the second short side 211 and a length of the long side 22 are both shorter than the lengths of the original second short side 211 and the original long side 22 without chamfer. In addition, the length of the first short side 111 of the first beam piece 1b is different from the length of the second short side 211 of the second beam piece 2b. A slope of the first bevel 112 of the first beam piece 1b is also different from a slope of the second bevel 212 of the second beam piece 2b.

As shown in FIG. 5, the first bevel 112 (or the chamfered portion C1) of the first beam piece 1b and the second bevel 212 (or the chamfered portion C2) of the second beam piece 2b are respectively located at relative inner corner positions between the first beam piece 1b and the second beam piece 2b.

The guide block 500 is connected (for example, connected in a plug-in manner) to one end of the guide rail body 100 to jointly form a slideway or a guide groove required. The guide block 500 has a first docking strip 5b and a second docking strip 6b that are symmetrically configured with each other. The word docking in the docking strip may be understood as corresponding abutment. Both the first docking strip 5b and the second docking strip 6b have corresponding abutting ends 51, 61 corresponding to the abutting ends 11, 21 respectively. As shown in FIG. 5, a shape of the corresponding abutting end 51 of the first docking strip 5b corresponds to a shape formed by the first short side 111 and the first bevel 112 of the first beam piece 1b. A shape of the corresponding abutting end 61 of the second butting strip 6b corresponds to a shape formed by the second short side 211 and the second bevel 212 of the second beam piece 2b.

Figure 6:
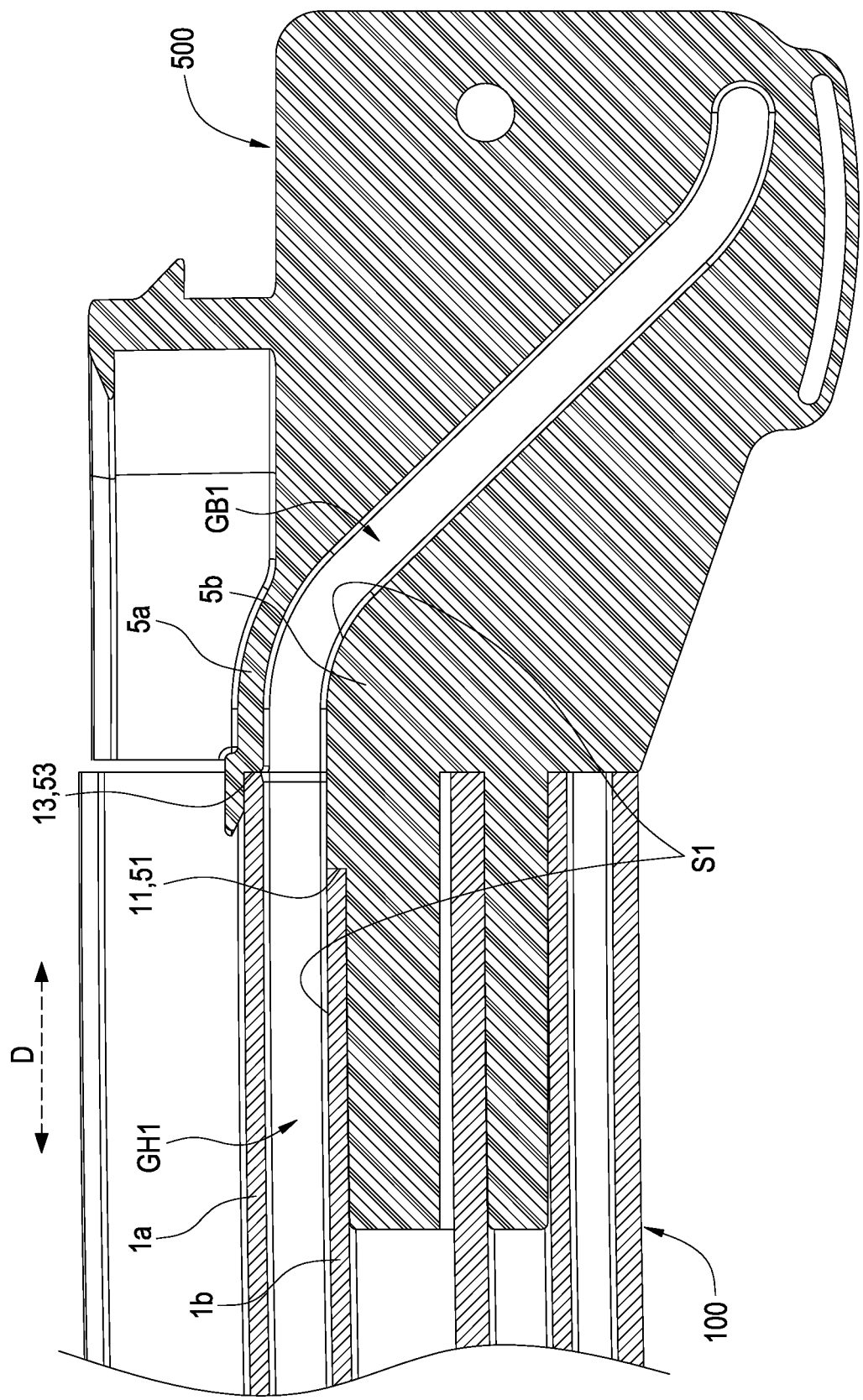
FIG. 6 is a cross-sectional side view of the silenced guide rail of the present disclosure.

As shown in FIG. 6, the silenced guide rail of the present disclosure may jointly form a first slideway S1 on the first beam piece 1b and the first docking strip 5b. The silenced guide rail may jointly form a second slideway (not shown, may refer to FIG. 6) on the first beam piece 1b and the first docking strip 6b. The first slideway S1 and the second slideway are connected end to end. Both the first slideway S1 and the second slideway are parallel to the guiding direction D. The slideway may be understood as a sliding passageway.

As shown in FIG. 7, the guide post 800 is disposed (for example, rotatably connected) to the guided object O. The guided object O may be a glass frame of the sunroof. As shown in FIG. 7, it is only one side of the glass frame. The guide post 800 may be a single-piece guide post or a multi-piece guide post. In the present embodiment, a multi-piece guide post is taken as an example for description. A multi-piece guide post 800 includes a first post 8a and a second post 8b rotatably connected to the guided object O. The first post 8a and a second post 8b are rollers, and the first post 8a and a second post 8b are connected in series with each other to form a straight guide post 800. The guide post 800 is parallel to the width. That is, the guide post 800 is parallel to the first short side 111 and the second short side 211.

As shown in FIG. 8 to FIG. 11, the guide post 800 spans between the first slideway S1 and the second slideway (not shown) and is divided into two sections. These two sections are the first post 8a and the second post 8b. The first post 8a and the second post 8b are slidably connected to the first slideway S1 and the second slideway respectively.

When the guide post 800 moves on the slideway along the guiding direction D (for example, moving from the right side to the left side of FIG. 6). The first and second short sides 111 and 211 parallel to the guide post 800 are shortened by the chamfered portions C1 and C2 caused by the first and second bevels 112 and 212. That is, the lengths of the first and second short sides 111 and 211 are shorter than the length of an original short sides that are not connected by the first and second bevels 112 and 212. As a result, shortening the length of the first and second short sides 111 and 211, which would otherwise be collided (the guide post 800 collides with the first and second short sides 111 and 211 with sides parallel to each other) with the guide post 800, may reduce a volume of abnormal noise. Therefore, it has the effect of keeping quiet.

Figure 9:
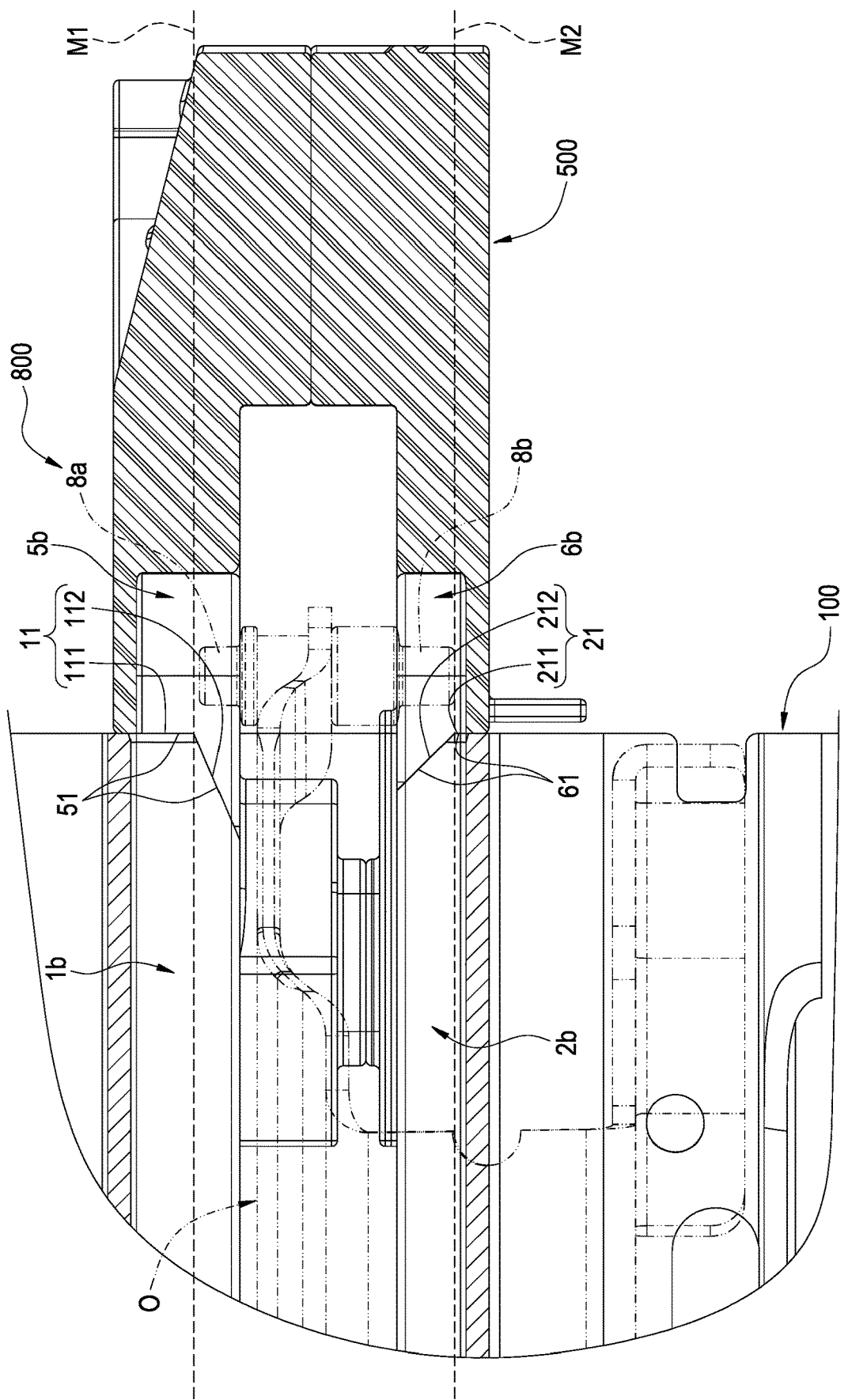
FIG. 9 is a cross-sectional top view of the silenced guide rail of the present disclosure (including the guide post).
Figure 10:
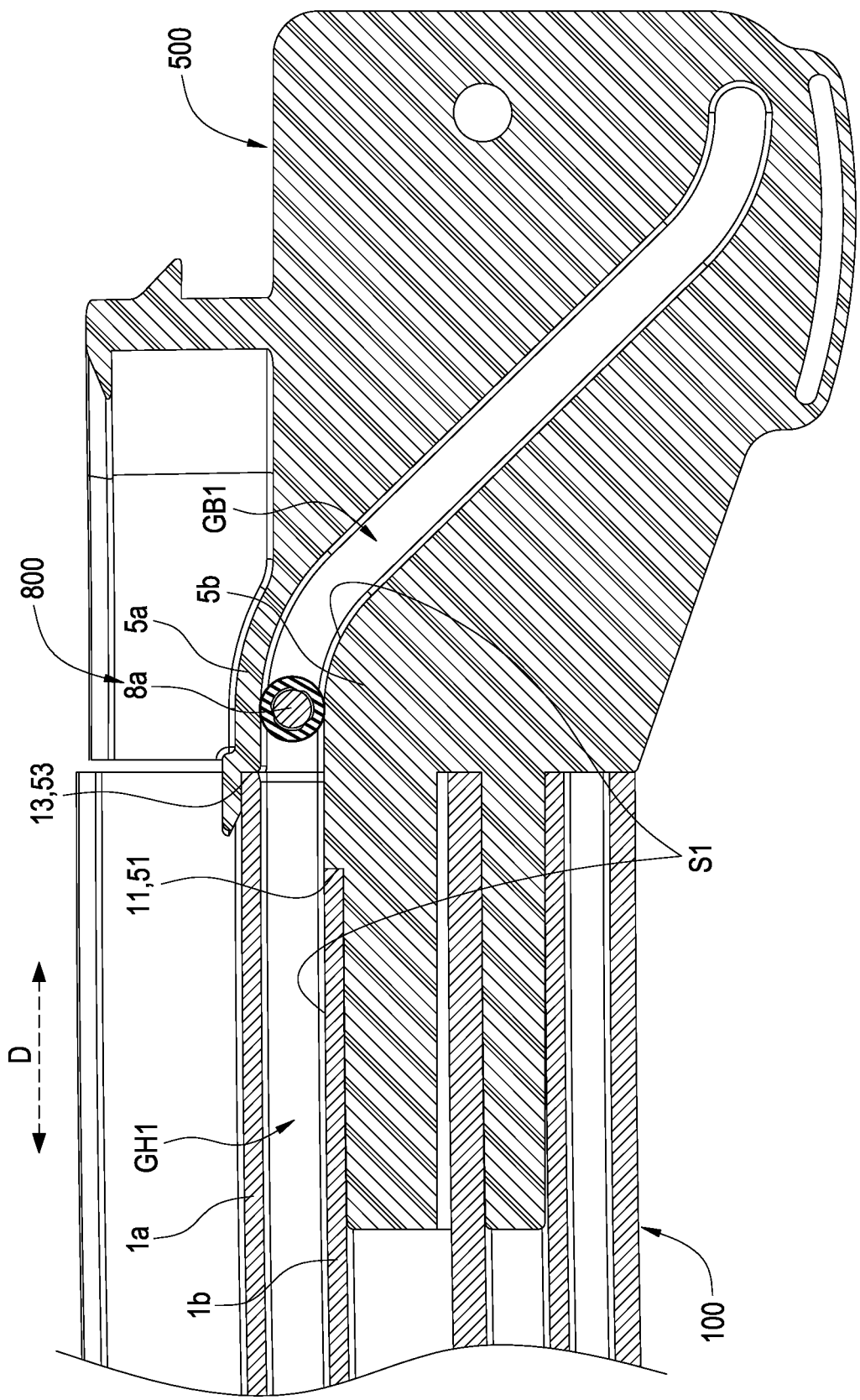
FIG. 10 is a cross-sectional side view of the silenced guide rail of the present disclosure corresponding to FIG. 9.

As shown in FIG. 9, without changing the guide post 800, an original length of the guide post 800 is shorter than the distance between the first slideway S1 and the second slideway. When the first bevel 112 (or truncated corner portion C1) and the second bevel 212 (or truncated corner portion C2) are respectively located in the relative inner corner positions between the first beam piece 1b and the second beam piece 2b, the first bevel 112 and the second bevel 212 just matches the original length of the guide post 800. Two opposite outer ends of the guide post 800 (marked lines M1 and M2) only reach the first and second bevel 112, 212 respectively, but not reach the first and second short sides 111, 211. That is, the guide post 800 will no longer collide with the first and second short sides 111 and 211 when the guide post 800 is moving, so the volume of abnormal noise may be further reduced. In other embodiments not shown in the drawings, the two opposite outer ends (marked lines M1, M2) of the guide post 800 may also only slightly reach to the length of the first short side 111 or the second short side 211, there is only a slight collision.

Figure 11:
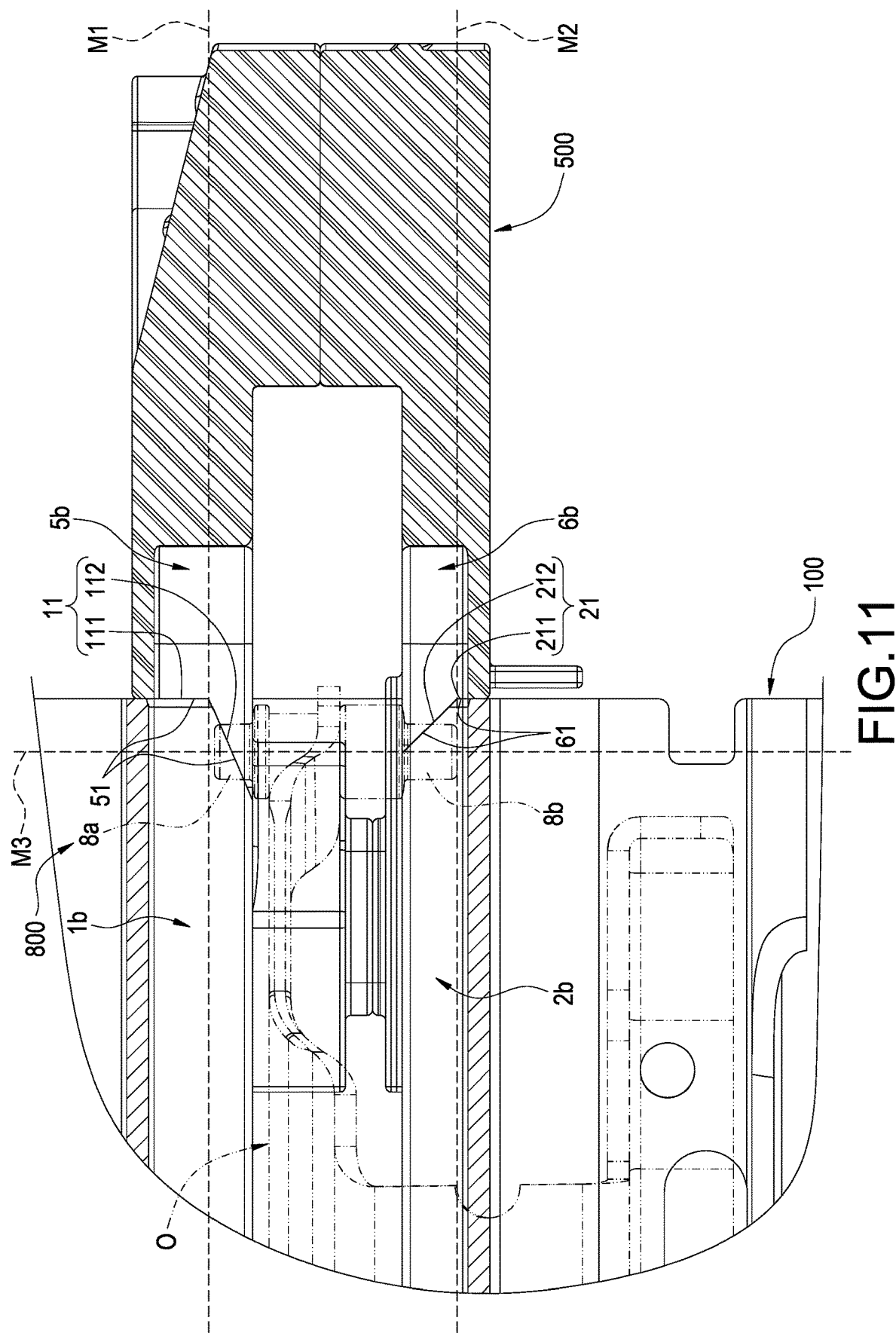
FIG. 11 is the cross-sectional top view of the silenced guide rail of the present disclosure when the guide post touches a bevel.

As shown in FIG. 11, the first bevel 112 and the second bevel 212 obliquely intersect to a straight line (marking line M3) constituting the guide post 800. When the guide post 800 moves, even if the guide post 800 touches the first and second bevel 112, 212, it will only generate slight abnormal noise. Only when the guide post 800 is separated from terminals of the first and second bevel 112 and 212 (that is, a left end of each bevel in FIG. 11), there will be loud abnormal noise. The slopes of the first and second bevel 112, 212 are configured to be different from each other, so that the terminals of the first and second bevel 112, 212 are misaligned with each other in the width direction. Therefore, the first and second bevels 112 and 212 will not generate abnormal noise with a large volume at the same time, and thus have an effect of reducing the volume of the abnormal noise.

As shown in FIG. 1 to FIG. 4, FIG. 5, and FIG. 8, the guide rail body 100 may also have a first beam piece 1a and a second beam piece 2a. The two first beam pieces 1a, 1b are stacked on top of each other and spaced apart from each other to form a first main body guide groove GH1 therebetween. The two second beam pieces 2a, 2b are also stacked on top of each other and spaced apart from each other to form a second main body guide groove GH2 therebetween. The guide block 500 has a first docking strip 5a and a second docking strip 6a. The two first docking strips 5a, 5b are stacked on top of each other and spaced apart from each other to form a first guide block guide groove GB1 therebetween. The two second docking strips 6a and 6b are also stacked on top of each other and spaced apart from each other to form a second guide block guide groove GB2 therebetween.

The first main body guide groove GH1 and the first guide block guide groove GB1 are connected to and communicate with each other. The first post 8a of the guide post 800 extends into the first main body guide groove GH1 and the first guide block guide groove GB1 that are connected to each other. The second main body guide groove GH2 and the second guide block guide groove GB2 are also connected to each other and communicate with each other. The second post 8b of the guide post 800 extends into the second main body guide groove GH2 and the second guide block guide groove GB2 that are connected to each other.

The first beam piece 1a located above has an adjacent end 13 composed of an unshortened first original short side 131 (i.e., the aforementioned original short side). The length of the first short side 111 of the first beam piece 1b located below is shorter than a length of the first original short side 131. The second beam piece 2a located above has an adjacent end 23 formed by an unshortened second original short side 231 (i.e., the aforementioned original short side). The length of the second short side 211 of the second beam piece 2b located below is shorter than a length of the second original short side 231.

The first docking strip 5a located above has a corresponding adjacent end 53 corresponding to the adjacent end 13. The second docking strip 6a located above has a corresponding adjacent end 63 corresponding to the adjacent end 23.

In summary, the silent guide rail of the present disclosure may achieve an intended purpose and solve problems in related art. The silent guide rail of the present disclosure fully meets requirements of a patent application, and the application is filed in accordance with the patent law. Please check carefully and grant the patent for the present disclosure to protect rights of creator.

The technical contents are only some embodiments of the present disclosure, and is not used to limit the scope of the present disclosure. Any modification of the structure, the change of the proportional relationship, or the adjustment of the size should be within the scope of the technical contents disclosed by the present disclosure without affecting the effects and the achievable effects of the present disclosure.

What is claimed is:

1. A silenced guide rail comprising:
a guide rail body, comprising a beam piece, and the beam piece comprising an abutting end;
a guide block, connected to one end of the guide rail body, the guide block comprising a docking strip, and the docking strip comprising a corresponding abutting end corresponding to the abutting end, wherein the abutting end comprises a short side corresponding to a width of the beam piece, and comprises a bevel that is diagonally connected to one end of the short side and is inclined along a direction of a length of the beam piece; a shape of the corresponding abutting end corresponds to a shape formed by the short side and the bevel; and
a slideway, formed on the beam piece and the docking strip.

2. The silenced guide rail in claim 1, wherein the beam piece further comprises a long side, and the short side is correspondingly perpendicular to the long side, and a chamfered portion is formed on the beam piece between one end of the bevel connected to the long side and one end of the bevel connected to the short side.

3. The silenced guide rail in claim 2, wherein the guide rail body comprises a guiding direction, both the slideway and the long side are parallel to the guiding direction.

4. The silenced guide rail in claim 1, further comprising a guide post slidably connected to the slideway, wherein the guide post is parallel to the short side.

5. The silenced guide rail in claim 1, wherein a number of the beam piece is two, the two beam pieces are respectively a first beam piece and a second beam piece that are arranged symmetrically to each other, both the first beam piece and the second beam piece have the abutting end, wherein a length of the short side of the first beam piece is different from a length of the short side of the second beam piece, and a slope of the bevel of the first beam piece is different from a slope of the bevel of the second beam piece.

6. The silenced guide rail in claim 5, wherein each of the two bevels comprises two ends, one of the two ends of each bevel is misaligned with each other in a width direction of the beam piece.

7. The silenced guide rail in claim 5, further comprising an additional slideway, wherein a number of the docking strip is two, the two docking strips are respectively a first docking strip and a second docking strip that are arranged symmetrically to each other, both the first docking strip and the second docking strip have the corresponding abutting end, and each corresponding abutting end respectively abuts against each abutting end, wherein the slideway is formed on the first beam piece and the first docking strip, and the additional slideway is formed on the second beam piece and the second docking strip.

8. The silenced guide rail in claim 7, further comprising a guide post spanning between the slideway and the additional slideway, wherein the guide post is divided into two sections, the two sections of the guide post are respectively slidably connected to the slideway and the additional slideway, and the guide post is parallel to each of the short sides.

9. The silenced guide rail in claim 8, wherein the guide post only reaches the bevel of the first beam piece or the bevel of the second beam piece, and the guide post is unreached to the short side of the first beam piece or the short side of the second beam piece.

10. The silenced guide rail in claim 5, wherein the bevel of the first beam piece and the bevel of the second beam piece are respectively located at relative inner corner positions between the first beam piece and the second beam piece.

* * * * *